No. 876,757. PATENTED JAN. 14, 1908.
H. J. WINTHERLICH.
APPARATUS FOR PRESERVING EGGS.
APPLICATION FILED MAY 16, 1907.
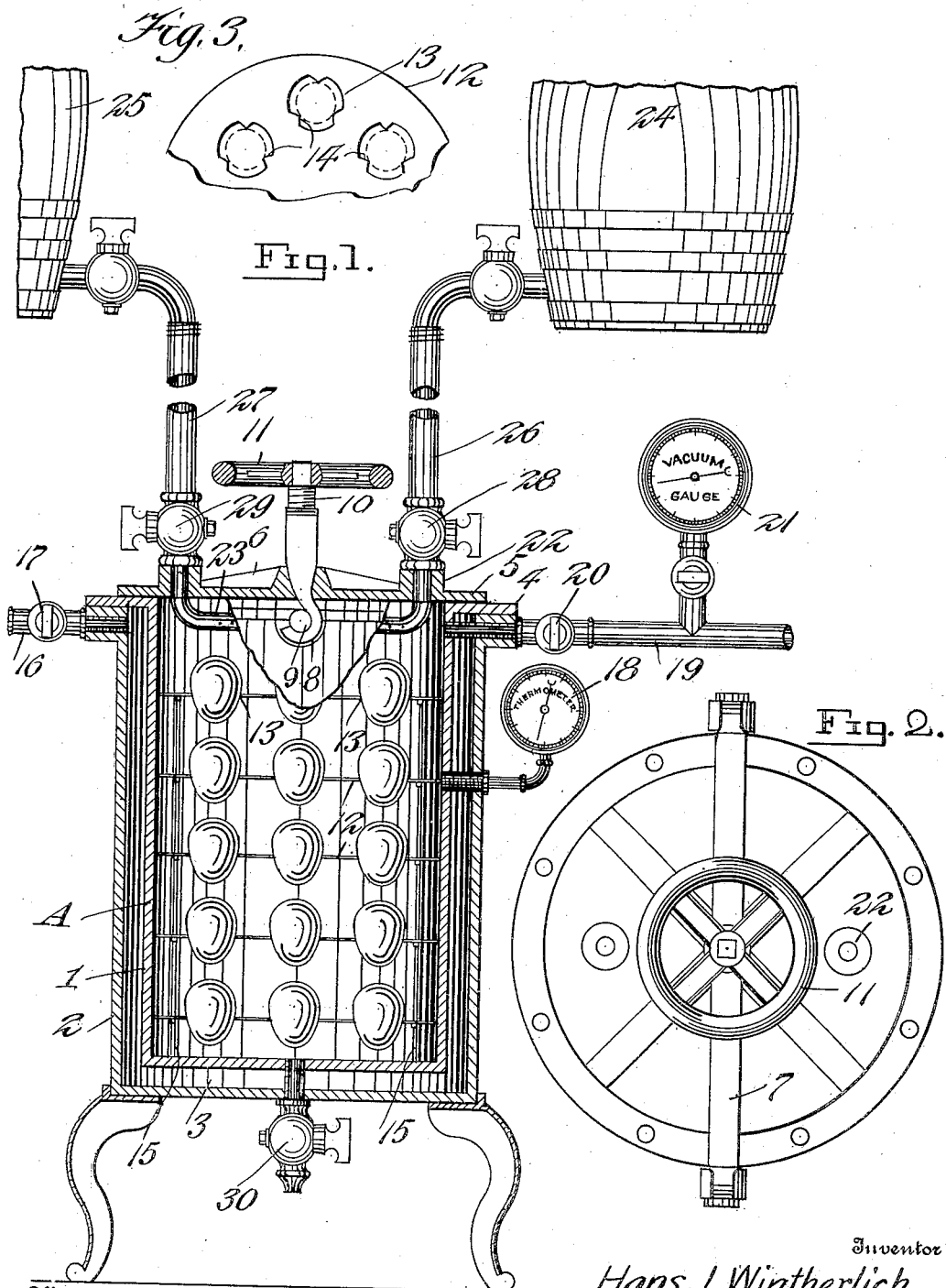
Witnesses
Geo. Ackman
C. Bradway
Inventor
Hans J. Wintherlich
By
Victor J. Evans
Atty.

UNITED STATES PATENT OFFICE.

HANS J. WINTHERLICH, OF OMAHA, NEBRASKA, ASSIGNOR OF ONE-THIRD TO WILL. R. SMITH AND ONE-THIRD TO ANTON M. LUNDGARD, BOTH OF COUNCIL BLUFFS, IOWA.

APPARATUS FOR PRESERVING EGGS.

No. 876,757.  Specification of Letters Patent.  Patented Jan. 14, 1908.

Application filed May 16, 1907. Serial No. 374,004.

*To all whom it may concern:*

Be it known that I, HANS J. WINTHERLICH, a citizen of the United States, residing at Omaha, in the county of Douglas and State of Nebraska, have invented new and useful Improvements in Apparatus for Preserving Eggs, of which the following is a specification.

This invention relates to an apparatus for sterilizing eggs, which depends for its operation upon the destroying of the germs in the eggs, the elimination of the fluid contained between the egg shell and lining tissue, and the application of a suitable preservative whereby the eggs can be kept for an indefinite time without becoming stale or decomposed.

The invention has for one of its objects to improve and simplify the construction and operation of devices of this character so as to be comparatively easy and inexpensive to manufacture, readily operated, and thoroughly efficient and reliable in service.

A further object of the invention is the provision of an air-tight receptacle for receiving the eggs which is connected with a vacuum pump and provided with a steam jacket whereby the eggs can be first brought to the desired temperature to kill the germs and open the pores of the shells and then subjected to the influence of a vacuum for eliminating the fluid contained between the egg shells and tissue, there being provision for supplying a preservative solution to the receptacle for impregnating the egg shell after the pores have been opened and the fluid extracted from the eggs.

A further object is the employment of a receptacle of the character referred to having separate controllable means for supplying suitable solutions to the vessel for treating the eggs, one solution to act as a preservative and the other to seal the pores of the egg shells.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a central vertical section of the sterilizing device with the attached parts shown in elevation. Fig. 2 is a plan view of the vessel or receptacle. Fig. 3 is a fragmentary plan view of one of the egg trays or holders.

Similar reference characters are employed to designate corresponding parts throughout the several views.

Referring to the drawing, A designates the body of the device which comprises a vessel or receptacle 1 of any suitable size and shape and preferably of iron, and 2, a jacket surrounding the vessel and coöperating therewith to form a steam space 3, the vessel being open at its top and provided with an annular flange 4 that fits over the top of the jacket or shell 2 and is bolted thereto so as to form a steam-tight chamber. The top of the vessel is closed by a removable cover 5 in the form of a disk or plate having radial ribs 6. The cover is held in place by an arched cross-bar 7 terminating in hooks 8 that engage around lugs 9 on the outside jacket or shell, there being a screw 10 at the center of the cross-bar which bears at its lower end against the cover and is provided with a wheel 11 permitting the screw to be turned to tighten or loosen the cover by means of the cross-bar.

Arranged within the receptacle 1 are superimposed egg trays or holders 12 in the form of disks having apertures 13 for the reception of the eggs, each aperture being provided with lugs 14, as shown in Fig. 3, so that around each egg will be a space through which the preserving and sealing solutions can freely pass. The trays or holders 12 are provided with legs 15, the legs of the lowermost tray resting on the bottom of the vessel 1, while those of the other legs rest directly on the trays themselves, whereby the trays are conveniently removable for the purpose of placing the eggs to be sterilized, and removing those that have been treated. The chamber 3 is supplied with steam through a pipe 16 that has a cut-off valve 17, and the steam surrounds the vessel 1 so that heat is conveyed to the eggs for the purpose of killing the germs therein and opening the pores of the shells.

In order to accurately determine the temperature to which the eggs are raised, the thermometer 18 is applied to the vessel, as shown. Communicating with the egg-containing vessel 1 is a pipe 19 connected with a vacuum pump and provided with a valve 20 for opening and closing the pipe, there being provided in the pipe a vacuum gage 21. In the cover 6 are apertured bosses 22 that receive the ends of a distributing pipe 23 provided with perforations or other outlet means. The pipe 23 has connected at opposite ends tanks 24 and 25 by flexible connections 26 and 27, and in the connections are cut-off valves 28 and 29.

In practice, the eggs are placed in the holders 12 and the latter positioned in the vessel 1 through the top thereof and arranged in superimposed relation. The cover 6 is then clamped in position so as to make an air-tight joint. The valve 17 is opened to admit steam to the chamber 3 for the purpose of heating the eggs to the required temperature for killing the germs and opening the pores of the shells, which temperature is ascertained by the thermometer 18. The vacuum pump is then brought into operation so that the section produced thereby will draw the fluid contained between the egg shells and tissue through the pores of the shell. After this extraction of the fluid has been completed, the valve 20 is closed and an antiseptic liquid, preferably a strong sealing solution, is applied to the vessel 1 by opening the valve 28. This solution enters the pores of the egg and takes the place of the fluid that has been abstracted from the latter. Thus, superfluous antiseptic liquid is drawn off through the drain cock 29, and after the vessel is drained, the cock 30 is closed and the valve 20 opened so that the air will again be pumped out. The steam supply, which has been cut off previously to the supply of the antiseptic liquid, is again opened so as to heat the eggs and open the pores, thereby preparing the eggs for the reception of the sealing solution, which is supplied by opening the valve 29. This solution completely covers the eggs and fills the pores of the shells so that air will be prevented from acting on the eggs and causing them to spoil, and simultaneously with the supply of the sealing solution, the vacuum pump is kept in operation so as to dry the eggs and render them fit for immediate packing.

From the foregoing description, taken in connection with the accompanying drawing, the advantages of the construction and of the method of operation will be readily apparent to those skilled in the art to which the invention appertains.

Having thus described the invention, what I claim is:—

1. In an apparatus for preserving eggs, the combination of a receptacle, means for supporting eggs therein, a vacuum producing means connected with the receptacle, means for subjecting the receptacle and contents to heat for opening the pores of the eggs and killing the germs, and separate means for supplying antiseptic and sealing solutions to the receptacle.

2. In an apparatus for preserving eggs, the combination of a receptacle, egg holders therein, a steam jacket for the receptacle, a vacuum producing means connected with the receptacle, separate devices connected with the receptacle for supplying preserving and sealing solutions independently, and a drainage means for the vessel.

3. In an apparatus for preserving eggs, the combination of a receptacle, a heating jacket therefor, a removable cover for the vessel, a spraying device carried by the cover and arranged within the vessel, separate means connected with the device for supplying solution to the vessel without removing the cover from the vessel, a drain for the vessel, and means for drawing off air from the vessel.

4. In an apparatus for preserving eggs, the combination of a receptacle, a removable cover, means for heating the vessel, means for creating a vacuum in the vessel, a spraying device on the cover, separate tanks, and flexible connections between the tanks and device.

5. In an apparatus for preserving eggs, the combination of a vessel, a removable cover, a cross-bar extending across the cover and adjustably connected with the body of the vessel, a clamping screw on the cross-bar arranged to bear on the cover for clamping the latter in place, a liquid supplying device fixed on the cover, and valve-controlled conduits for separately supplying preserving and sealing solutions to the vessel.

6. In an apparatus for preserving eggs, the combination of a receptacle, egg holders therein arranged in superimposed relation and each comprising a plate having apertures with inwardly projecting lugs for engaging the eggs, means for holding the plates spaced apart from each other, a steam jacket for heating the receptacle, means for draining the receptacle, means for producing a vacuum in the receptacle, and separate means for supplying a preserving and a sealing solution to the receptacle.

7. In an apparatus for preserving eggs, the combination of an air-tight vessel, means for supporting eggs one above another therein, means surrounding the vessel for heating the eggs, means for producing a vacuum in the vessel, and separate controllable means communicating with the top of the vessel for discharging fluids on the top eggs whereby the fluid will drain upon the sub-adjacent eggs.

In testimony whereof, I affix my signature in presence of two witnesses.

HANS J. WINTHERLICH.

Witnesses:
S. E. WAIT,
C. M. HICKMAN.